(12) United States Patent
Kasashima et al.

(10) Patent No.: US 8,753,412 B2
(45) Date of Patent: Jun. 17, 2014

(54) METHOD AND JIG ASSEMBLY FOR MANUFACTURING OUTER BLADE CUTTING WHEEL

(75) Inventors: Masaki Kasashima, Echizen (JP); Yuhito Doi, Echizen (JP); Harukazu Maegawa, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 588 days.

(21) Appl. No.: 12/770,263

(22) Filed: Apr. 29, 2010

(65) Prior Publication Data

US 2010/0275522 A1   Nov. 4, 2010

(30) Foreign Application Priority Data

May 1, 2009   (JP) ................................. 2009-111762

(51) Int. Cl.
*B24D 99/00* (2010.01)
*C25D 5/02* (2006.01)
*C25D 15/00* (2006.01)

(52) U.S. Cl.
USPC .................. 51/293; 51/307; 205/89; 205/110

(58) Field of Classification Search
USPC .................................................. 205/89, 110
See application file for complete search history.

(56) References Cited

U.S. PATENT DOCUMENTS

| | | | |
|---|---|---|---|
| 2,254,531 A * | 9/1941 | Kirchner et al. | 118/623 |
| 3,762,882 A | 10/1973 | Grutza | |
| 5,250,084 A * | 10/1993 | Lansell et al. | 51/293 |
| 6,012,977 A | 1/2000 | Yoshikawa et al. | |
| 6,098,609 A | 8/2000 | Ishizuka | |
| 6,517,427 B1 | 2/2003 | Yoshikawa et al. | |
| 2008/0171175 A1 | 7/2008 | Park | |
| 2009/0165768 A1 | 7/2009 | Kasashima et al. | |

FOREIGN PATENT DOCUMENTS

| | | | | |
|---|---|---|---|---|
| CN | 101537603 A | 9/2009 | | |
| EP | 2075092 A2 * | 7/2009 | | B24D 5/12 |
| JP | 1-252365 A | 10/1989 | | |
| JP | 7-207254 A | 8/1995 | | |
| JP | 9-174441 A | 7/1997 | | |
| JP | 10-175171 A | 6/1998 | | |
| JP | 10-175172 A | 6/1998 | | |
| JP | 2942989 B1 * | 8/1999 | | B26D 1/24 |
| JP | 2005-193358 A | 7/2005 | | |
| JP | 2005-219169 A | 8/2005 | | |

(Continued)

OTHER PUBLICATIONS

European Search Report dated Sep. 1, 2010, issued in corresponding European Patent Application No. 10250867.8.

*Primary Examiner* — Kaj K Olsen
*Assistant Examiner* — Jared Wood
(74) *Attorney, Agent, or Firm* — Westman, Hattori, Daniels & Adrian, LLP

(57) ABSTRACT

An outer blade cutting wheel comprising an annular thin disc base of cemented carbide and a blade section is manufactured by disposing permanent magnet pieces on the side surfaces and inward of the outer periphery of the base to produce a magnetic field, providing magnetic coated diamond and/or CBN abrasive grains such that the magnetic field may act on the grains, causing the grains to be magnetically attracted to the base outer periphery, and electroplating or electroless plating whereby the abrasive grains are bound to the base outer periphery to form the blade section.

5 Claims, 7 Drawing Sheets

(56) References Cited

FOREIGN PATENT DOCUMENTS

| | | |
|---|---|---|
| JP | 2006-15468 A | 1/2006 |
| JP | 2009-172751 A | 8/2009 |
| KR | 20090073019 A | 7/2009 |
| SG | 153773 A1 | 7/2009 |
| WO | 96/23630 A1 | 8/1996 |

* cited by examiner

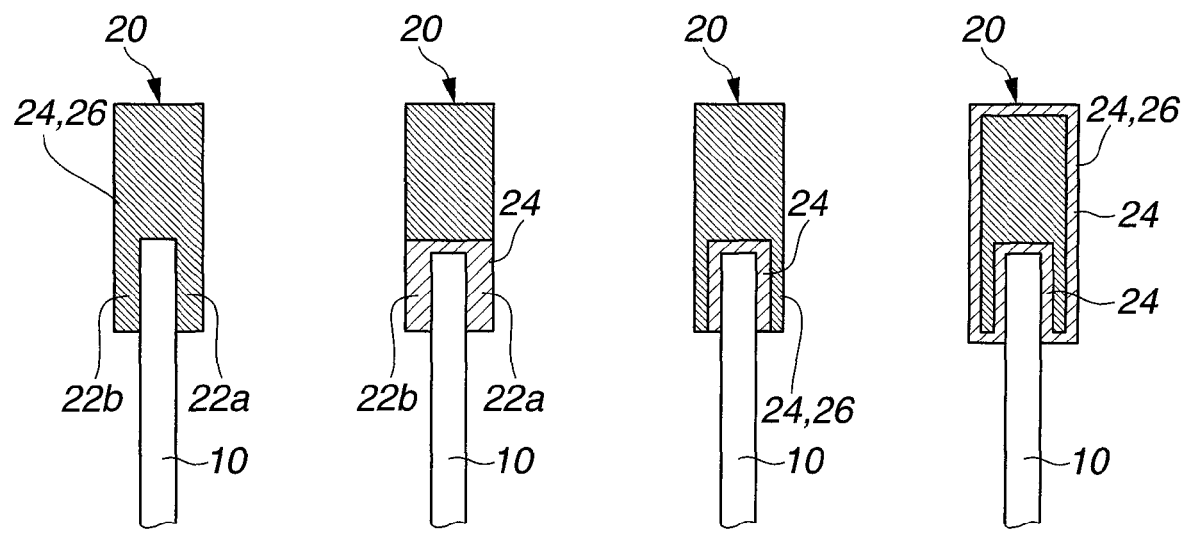

METHOD AND JIG ASSEMBLY FOR MANUFACTURING OUTER BLADE CUTTING WHEEL

CROSS-REFERENCE TO RELATED APPLICATION

This non-provisional application claims priority under 35 U.S.C. §119(a) on Patent Application No. 2009-111762 filed in Japan on May 1, 2009, the entire contents of which are hereby incorporated by reference.

TECHNICAL FIELD

This invention relates to a method and jig assembly for manufacturing an outer blade cutting wheel for cutting rare earth sintered magnets.

BACKGROUND ART

Outer blade cutting wheels for cutting rare earth permanent magnets are disclosed in JP-A 9-174441, JP-A 10-175171, and JP-A 10-175172 as comprising a cemented carbide base having an outer periphery to which diamond abrasive grains are bonded with phenolic resins or the like. Since diamond grains are bonded to the cemented carbide base, the base has been improved mechanical strength over prior art alloy tool steel and high-speed steel bases, leading to a higher accuracy of machining. Also by reducing the thickness of the blade with using a cemented carbide base, the yield of machining can be improved and the machining speed be accelerated. While these cutting wheels using cemented carbide bases show better cutting performance than prior art outer blade cutting wheels, the market poses an increasing demand to reduce the cost of cutting wheels. It would be desirable to have a novel high-performance cutting-off wheel overwhelming the prior art outer blade cutting wheels.

While various cutting techniques including outer blade, inner blade and wire saw cutting-off techniques are implemented in machining rare earth permanent magnets or sintered magnets, the outer blade cutting-off technique is most widely employed. By virtue of many advantages including an inexpensive cutting wheel machine, an acceptable cutting allowance on use of cemented carbide blade, a high accuracy, a relatively high machining speed, and a mass scale of manufacture, the outer blade cutting-off technique is widely employed in cutting of rare earth sintered magnets.

Traditional cutting wheels for outer cutting used bases made of steel alloy materials such as alloy tool steels (e.g., SKD grade in JIS) and high-speed steels. However, JP-A 9-174441, JP-A 10-175171, and JP-A 10-175172 (the inventors including the same as the present) disclose cutting wheels using bases of cemented carbides. Cemented carbides made by cementing tungsten carbide (WC) grains in a binder matrix of cobalt or nickel metal by sintering are high-rigidity materials having a Young's modulus as high as 450 to 700 GPa and extraordinarily stronger than the steel alloy materials having a Young's modulus of the order of 200 GPa.

A high Young's modulus implies that the quantity of deformation of a blade under a cutting force (or cutting resistance) is reduced. This, in turn, implies that under the same cutting force, the deflection of the blade is reduced, and that for the same deflection of the blade, the same accuracy of cutting is possible even when the thickness of the blade is decreased. Although the cutting force applied per unit area of the blade remains substantially unchanged, the overall cutting force applied to the blade becomes smaller by the thickness decrease. In the multiple machining process where a magnet block is machined into multiple pieces at a time by a cutter assembly comprising a multiplicity of cutting wheels, the total cutting force applied to the cutter assembly is reduced. This allows the number of cutting wheels to be increased for a motor of the same power, or the cutting force to be reduced for the same number of cutting wheels, leading to a saving of the motor power. If the motor power has a margin relative to the cutting force, the advance of the cutting wheel assembly may be accelerated to shorten the cutting time.

The use of high-rigidity cemented carbide bases considerably improved the productivity of outer blade cutting. However, the market imposes an ever increasing demand on rare earth sintered magnets, with manufacturers entering into keen competition toward cost reduction. For effective utilization of rare earth sintered magnet material, the smaller the cutting allowance, the higher becomes the material utilization yield. The higher the machining speed, the more is improved the productivity. It would be desirable to have an outer blade cutting wheel which offers a high rigidity and high accuracy despite a reduced thickness of blade relative to the current cemented carbide base cutting wheels.

CITATION LIST

Patent Document 1: JP-A H09-174441
Patent Document 2: JP-A H10-175171
Patent Document 3: JP-A H10-175172
Patent Document 4: JP-A 2005-193358
Patent Document 5: JP-A H07-207254
Patent Document 6: JP 2942989
Patent Document 7: JP-A 2005-219169
Patent Document 8: WO 96/23630

DISCLOSURE OF THE INVENTION

The applicant proposed a technique of fixedly bonding diamond abrasive grains with a phenolic or similar resin to the outer periphery of an annular cemented carbide base and a technique of fixedly bonding diamond or CBN abrasive grains with a metal binder having an adequate Young's modulus to the outer periphery of an annular cemented carbide base (see JP-A 2009-172751, EP 2075092, US 2009165768, KR 20090073019, CN 101537603, or SG 153773).

The outer blade cutting wheel consists of two components, a base and a blade. Since the base that accounts for the majority of the outer blade cutting wheel is replaced by a high-rigidity cemented carbide base, the outer blade cutting wheel is improved in mechanical strength and also improved in accuracy of machining, over the prior art outer blade cutting wheels using bases of alloy tool steel and high-speed steel. Additionally, since the binder is replaced by a metal having an appropriate Young's modulus, the overall outer blade cutting wheel is improved in mechanical strength. The resulting wheel attains three performance improvements, an improvement in accuracy of machining, an improvement in material yield by thinning of the blade, and a reduction of machining cost due to acceleration of the machining speed, as compared with the prior art outer blade cutting wheels of the resin bond type using phenolic resins or polyimide resins as the abrasive binder.

While the outer blade cutting wheel comprising a base of cemented carbide and a blade of abrasive grains bound by a metal bond shows better machining performance than the prior art outer blade cutting wheels, it is desired to reduce the cost of manufacture of that cutting wheel. Both the technique of binding abrasive grains to a cemented carbide base with a metal bond and the technique of shaping a blade section (or abrasive layer) of abrasive grains bound by a metal bond invite an extension of manufacture time and a lowering of manufacture yield, and eventually an increase of manufacture cost, as compared with the prior art well-known techniques. The thus manufactured wheel is costly over the prior art outer blade cutting wheels. Although the outer blade cutting wheel comprising a cemented carbide base and a metal-bonded abrasive grain blade shows higher performance in machining as compared with the prior art outer blade cutting wheels having a resin-bonded abrasive grain blade, the blade can be of higher cost. The cost of the outer blade cutting wheel itself must be reduced before the demand for reduction of the manufacture cost of rare earth sintered magnet can be met.

An object of the invention is to provide a method and jig assembly for manufacturing an outer blade cutting wheel at a low cost. Using the method and jig assembly, an outer blade cutting wheel with better cost performance is manufactured at a high cost performance.

In conjunction with the manufacture of an outer blade cutting wheel comprising an annular disc-shaped base and a blade section formed on the outer periphery of the base, the inventors have found that better results are obtained by creating a magnetic field in proximity to the outer periphery of the base, and so that the magnetic field may act on abrasive grains pre-coated with a magnetic material to magnetize the coating, thereby attracting the abrasive grains to the outer periphery of the base, and plating in that state, thereby bonding the abrasive grains to the base outer periphery.

More particularly, the attachment of the abrasive layer (becoming a blade section) to the base is made tighter by controlling the remanence, size, magnetization direction, and position of permanent magnet pieces used. An outer blade cutting wheel comprising an abrasive layer having a selected height or a selected distribution of abrasive grains can be easily manufactured depending on a particular application.

As stated in the preamble, most outer blade cutting wheels used in the art for cutting rare earth sintered magnets are resin bond diamond cutting wheels having diamond abrasive grains bound with phenolic resins or the like. For the purposes of improving the yield and reducing the cost of machining rare earth sintered magnets, it is desired to reduce the thickness of the peripheral blade section and to accelerate the cutting speed.

In efforts to meet these requirements, JP-A 2009-172751 placed a focus on the bond used to bind abrasive grains to the outer periphery of a cemented carbide base. By increasing the Young's modulus of the bond, both the base and the abrasive layer to constitute the outer blade cutting wheel are increased in rigidity. Due to the synergistic effect of these components, the outer blade cutting wheel is increased in mechanical strength over the prior art.

With respect to machining of rare earth sintered magnet, the advent of such a high-performance outer blade cutting wheel has achieved an improvement in machining yield and a reduction of machining cost. However, the outer blade cutting wheel, in turn, is very difficult to manufacture or is manufactured in very low yields even if possible, when prior art well-known techniques such as the technique of binding abrasive grains to a base with a metal bond and the technique of truing the height or thickness of a blade section (or abrasive layer) of abrasive grains bound by a metal bond are used.

The technique of binding abrasive grains to a base with a metal bond includes, for example, depositing abrasive grains on a base and electroplating for binding; placing a metal braze and abrasive grains on a base and heating them for brazing; and pressure molding a powder mixture of abrasive grains and a powdered metal bond to the outer periphery of a base. It depends on the shape, size and material of a portion to which abrasive grains are bound whether or not these techniques are applicable. For example, when abrasive grains are to be bound to the outer periphery of an annular disc-shaped base as in the invention, the plating or brazing technique is very difficult to retain abrasive grains in close contact with the base until the abrasive grains are bound, because the base outer periphery has a limited surface area. The technique of pressure molding a powder mixture of abrasive grains and a powdered metal bond to the outer periphery of a base is also difficult to manufacture an outer blade cutting wheel because the base can be deflected by the strain upon molding.

Even if a wheel is manufactured, the shape and size of the blade section can be larger than desired depending on certain manufacturing conditions. This poses a need to true the blade section. Since the metal bond having higher mechanical strength than conventional resins is used, the operation of adjusting the size of the blade section is very difficult. In the case of resin bond, even if diamond abrasive grains (which are difficult to grind) are contained, simply grinding the resin may cause abrasive grains to readily shed because the resin has a low mechanical strength. As a result, an outer blade cutting wheel having a high dimensional accuracy is manufactured in a relatively simple manner. By contrast, in the case of metal bond having a mechanical strength sufficient to retain abrasive grains tightly over a long period of time to ensure a high accuracy of cutting, the same mechanical strength impedes grinding. As a result, it is very difficult to adjust the size of the abrasive layer.

Since the abrasive grains are embedded in the metal bond immediately after the abrasive grains are bound by the metal bond, the abrasive layer does not develop the self-sharpening action which is otherwise developed when rare earth sintered magnet is cut thereby. This makes more difficult the machining of the abrasive layer.

Accordingly, when the abrasive layer is machined for truing the size and shape thereof, for example, the thickness of the abrasive layer, the axial protrusion extent of the abrasive layer from the side surface, and the radial protrusion extent of the abrasive layer from the base periphery of the base, there is a risk that a longer machining time is needed until a high accuracy of truing is completed or a grinding tool such as a grinding wheel used in machining is soon consumed.

The machining time may be shortened by increasing the grinding speed or the depth of cut. Under such severer machining conditions, however, the abrasive layer or base may be crazed or cracked, or substantially chipped away. These defects may reduce the yield of manufacture.

Under the circumstances, the inventors focused the jig used when abrasive grains are bound to the outer periphery of the base with a metal bond to be deposited by a plating technique. The blade section playing the important role as the outer blade cutting wheel is formed by binding abrasive grains to the outer periphery of the base. Several approaches may be taken when abrasive grains are bound with a metal bond to be deposited by a plating technique. Such approaches include use of a composite plating bath having abrasive grains dispersed in electroplating liquid, co-deposition of metal and abrasive grains on the base, and plating on abrasive grains bonded with a conductive adhesive. In an alternative approach, the base is sandwiched between jig members to define a narrow space corresponding to the abrasive layer, the space is filled with abrasive grains so that the abrasive grains are retained therein by the frictional force developed among the grains, jig members and base, and plating is effected. It is also possible to carry out plating after abrasive grains pre-coated with a magnetic material (e.g., Ni) by plating or sputtering are magnetically attracted to an outer peripheral portion of the base by producing a magnetic field across the base by the known means (JP-A H07-207254), or by building permanent magnet pieces in jig members and sandwiching the base between the jig members for magnetizing the base. In a further approach, abrasive grains coated with a ductile metal such as Ni or Cu alone or in admixture with a powdered metal are disposed around an outer peripheral portion of the base, which is placed in a mold where pressure is applied to bind the abrasive grains to the base.

Of the foregoing, those approaches avoiding a conductive adhesive are preferable for the machining of rare earth sintered magnets because the blade section consists of abrasive grains and a metal bond. Among these, the approach to carry out plating after abrasive grains pre-coated with a magnetic material (e.g., Ni) by plating or sputtering are magnetically attracted to an outer peripheral portion of the base is most effective because no abrasive grains shed off during the plating, and the metal bond can be deposited so as to bind abrasive grains to the base without applying extra stress to the cemented carbide base.

To attract abrasive grains pre-coated with a magnetic material to the base under a magnetic field, the technique of using an electromagnet to produce a magnetic field across the base for magnetizing the abrasive grains, followed by plating to bind the abrasive grains to the base as disclosed in JP-A H07-207254 is effective. However, if the base portion to which abrasive grains are bound has a small volume or is made of a low saturation magnetization material such as cemented carbide, it is difficult to produce a magnetic field only across the outer peripheral portion of the base. As a result, abrasive grains may be attracted outside the desired site or a satisfactory attractive force may not be induced.

In addition, the electromagnet requires conductors and a power supply for electric conduction. If the manufacturing process involves contact with a conductive liquid as in the case of electroplating, the jig members and other components must be electrically insulated by a suitable means. Then the jig members become cumbersome to handle, and the manufacturing process becomes inefficient.

The inventors have found that an outer blade cutting wheel can be manufactured by using as the means for producing a magnetic field of the desired direction and strength at the desired site, permanent magnet pieces which are easy to control such parameters as size and shape, mounting the permanent magnet pieces on jig members, sandwiching the base between the jig members to define a space therebetween, placing abrasive grains pre-coated with a magnetic material in the space, attracting them to the base by the magnetic attractive force, plating to deposit a metal bond for binding abrasive grains to the base; that in the resulting outer blade cutting wheel, the amount of metal bond is optimized and the abrasive layer or blade section is controlled to the desired size as closely as possible; and that formation of the blade section is improved in yield, and the operation to true the size of the blade section is mitigated. Namely, a high-performance outer blade cutting wheel having a high dimensional accuracy can be manufactured at a low cost.

Accordingly, the present invention provides a method for manufacturing an outer blade cutting wheel and a jig assembly used therein.

In one aspect, the invention provides a method for manufacturing an outer blade cutting wheel comprising a base in the form of an annular thin disc of cemented carbide having an outer periphery and side surfaces and a blade section formed on the outer periphery of the base, said method comprising the steps of:

disposing at least two permanent magnet pieces having a remanence of at least 0.3 T each on the side surface of the base and inward of the base outer periphery or within a space located inward of the base outer periphery and extending 20 mm from the side surface of the base, to produce a magnetic field of at least 8 kA/m at the base outer periphery and within a space extending 10 mm from the base outer periphery, providing diamond and/or CBN abrasive grains coated with a magnetic material such that said magnetic field may act on the diamond and/or CBN grains, causing the abrasive grains to be attracted and secured in proximity to the base outer periphery by the resultant attractive force, and electroplating or electroless plating on the base outer periphery with the abrasive grains attracted thereto whereby the abrasive grains are bound to the base outer periphery to form the blade section.

Typically, the base in the form of an annular thin disc has an outer diameter of 80 to 200 mm, a thickness of 0.1 to 1.0 mm, an inner diameter of 30 to 80 mm, a Young's modulus of 450 to 700 GPa, and a saturation magnetization of at least 40 kA/m (0.05 T).

The diamond and/or CBN grains coated with a magnetic material preferably has a magnetic susceptibility $\chi$ of at least 0.6.

In a preferred embodiment, one or more permanent magnet pieces are disposed contiguously or equidistantly on either or both side surface of the base and concentric with the disc-form base.

In another aspect, the invention provides a jig assembly for use in the manufacture of an outer blade cutting wheel comprising a base in the form of an annular thin disc of cemented carbide having an outer periphery and a blade section formed on the outer periphery of the base, the jig assembly comprising at least a pair of jig members each comprising a cover of insulating material having a larger outer diameter than the base and at least one permanent magnet piece secured to the cover, disposed inward of the outer periphery of the base and having a remanence of at least 0.3 T, wherein when the base is held between the jig members, the magnet pieces in the jig members produce a magnetic field of at least 8 kA/m at the base outer periphery and within a space extending 10 mm from the base outer periphery, said magnetic field acting to attract and secure diamond and/or CBN abrasive grains coated with a magnetic material in proximity to the outer periphery of the base to keep them ready for electroplating or electroless plating.

The jig assembly may further comprise a cathode for electroplating disposed at the center of the cover. The jig assembly may further comprise a support shaft for supporting plural pairs of jig members.

ADVANTAGEOUS EFFECTS OF INVENTION

Using the manufacturing method and jig assembly, a high-performance outer blade cutting wheel can be manufactured in high yields and at a low cost.

BRIEF DESCRIPTION OF THE DRAWINGS

FIGS. 6A to 6D are cross-sectional views of a blade section formed on a base in different embodiments.

DESCRIPTION OF THE PREFERRED EMBODIMENT

Figure 1A:
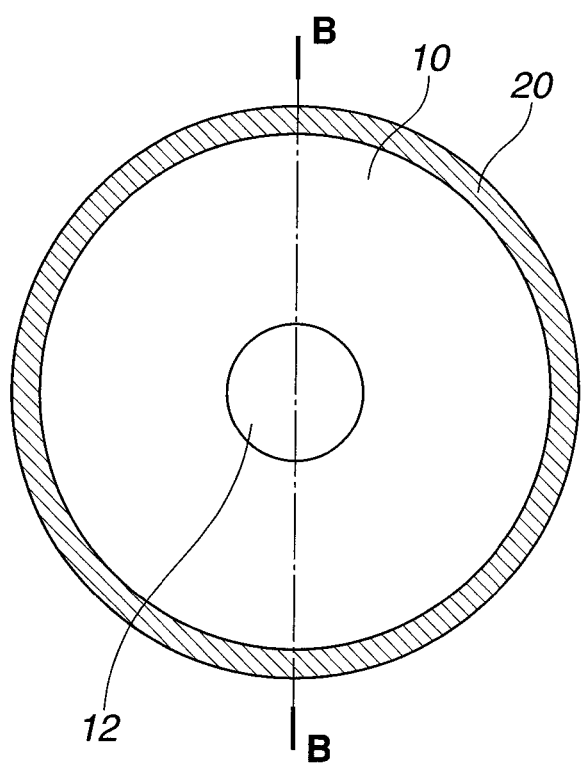
FIG. 1 schematically illustrates an outer blade cutting wheel in one embodiment of the invention, FIG. 1A being a plan view, FIG. 1B being a cross-sectional view taken along lines B-B in FIG. 1A, and FIG. 1C being an enlarged cross-sectional view of a circle C in FIG. 1B.
Figure 1B:
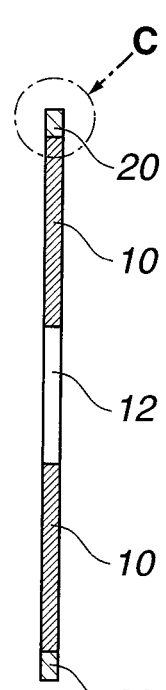

Referring to FIG. 1, the outer blade cutting wheel in one embodiment of the invention is illustrated as comprising a base 10 in the form of an annular thin disc and a blade section 20 disposed on the outer periphery of the base 10. The blade section 20 comprises abrasive grains bound with a metal bond, the abrasive grains comprising diamond grains, CBN grains or a mixture of thereof.

The base 10 is in the form of an annular thin disc, differently stated, a doughnut-shaped thin plate or circular thin plate having a center bore 12. Preferably the base has an outer diameter of 80 to 200 mm, more preferably 100 to 180 mm, defining an outer periphery, an inner diameter of 30 to 80 mm, more preferably 40 to 70 mm, defining the bore 12, and a thickness of 0.1 to 1.0 mm, more preferably 0.2 to 0.8 mm.

It is noted that the disc has a center bore and an outer periphery (peripheral surface), and side surfaces, as shown in FIG. 1. Thus, the terms "radial" and "axial" are used relative to the center of the disc, and so, the thickness is an axial dimension between side surfaces, and the height or length is a radial dimension, which are applicable to both the base and the blade section.

The base or disc having a thickness of 0.1 to 1.0 mm and an outer diameter of up to 200 mm is preferred because a base of such dimensions can be prepared to an acceptable accuracy and used consistently in cutting of rare earth sintered magnet blocks at a high dimensional accuracy over a long term. If the thickness is less than 0.1 mm, the base may be largely deflected independent of its diameter, and preparation of the base to an acceptable accuracy is difficult. A thickness of more than 1.0 mm may lead to a larger machining allowance. The outer diameter is less than or equal to 200 mm due to the limitations of the current techniques of manufacturing and working cemented carbide. The diameter of the bore is preferably in the range of 30 to 80 mm so that cutting wheels may be mounted on the shaft of a cutting machine.

Examples of the cemented carbide of which the base is made include those in which powder carbides of metals in Groups IVB, VB, and VIB of the Periodic Table such as WC, TiC, MoC, NbC, TaC and $Cr_3C_2$ are cemented in a binder matrix of Fe, Co, Ni, Mo, Cu, Pb, Sn or an alloy thereof, by sintering. Among these, typical WC—Co, WC—Ti, C—Co, and WC—TiC—TaC—Co systems are preferably used to form a base having a Young's modulus (an elastic modulus) of 450 to 700 GPa. Also, those cemented carbides which have an electric conductivity sufficient to electroplating or which can be given such an electric conductivity with palladium catalysts or the like are preferred. When cemented carbides are given an electric conductivity with palladium catalysts or the like, well-known agents such as conductive treating agents used in metallization of ABS resins may be employed.

With respect to magnetic properties of the base, the base preferably has a higher saturation magnetization because abrasive grains are secured to the base by magnetic attraction. Even if the saturation magnetization is low, abrasive grains pre-coated with a magnetic material can be magnetically attracted to the base by controlling the position of magnet pieces and the strength of the magnetic field. In this sense, the base may have a saturation magnetization of at least 40 kA/m (0.05 T).

The saturation magnetization of the base is determined by cutting a sample of 5 mm square from the base of a given thickness, and measuring a magnetization curve ($4\pi I$—H) of the sample at 24-25° C. by a vibrating sample magnetometer (VSM). The maximum of magnetization values in the first quadrant is the saturation magnetization.

The base may be C- or R-chamfered at its outer peripheral region for the purposes of enhancing the bond strength to the blade section having abrasive grains bound by a metal bond. Even when the boundary between the base and the abrasive layer is over-machined in error during blade thickness adjustment, the metal bond is retained at the boundary due to such chamfering, thereby preventing the blade section from separating off. The angle and amount of chamfering may be determined in accordance with the thickness of the base and the average particle size of abrasive grains because the workable region depends on the thickness of the base.

The blade section has abrasive grains bound by a metal bond. The abrasive grains used herein are diamond grains, CBN grains, or a mixture thereof while the abrasive grains should have been coated with a magnetic material. The size and hardness of abrasive grains to be coated with a magnetic material are determined in accordance with the intended application. For example, diamond grains (including natural diamond and industrial synthetic diamond) or cubic boron nitride (CBN) grains may be used alone, or a mixture of diamond grains and CBN grains may be used. Depending on a work, abrasive grains selected from single crystal and polycrystalline grains may be used alone or in admixture, whereby the micro-fracture of grains may be adjusted.

The size of abrasive grains depends on the thickness of the base to which abrasive grains are bound. Preferably abrasive grains have an average particle size of 10 to 500 μm. If the average particle size is less than 10 μm, there may be left smaller gaps between abrasive grains, allowing problems like glazing and loading to occur during the cutting operation and losing the cutting ability. If the average particle size is more than 500 μm, there may arise problems, for example, magnet pieces cut thereby may have rough surfaces. In consideration of the cutting ability, lifetime and the like, abrasive grains of a specific size within the range may be used alone or in admixture.

The magnetic material with which abrasive grains are coated may be selected so that the coated abrasive grains may have a magnetic susceptibility $\chi$ of preferably at least 0.6, more preferably at least 1.0, to ensure that the abrasive grains are magnetically attracted to the base of cemented carbide having a low saturation magnetization within a short time, and do not shed off during binding by a plating technique. Specifically the magnetic material is at least one metal selected from Ni, Fe, and Co, an alloy of two or more of these metals, or an alloy of at least one of these metals and one or both of P and Mn. By any well-known techniques such as sputtering, electroplating and electroless plating, the metal is applied to form a coating having a thickness of preferably 0.5 to 100%, more preferably 2 to 50% of the grain diameter.

Since the magnetic susceptibility of coated abrasive grains depends on the magnetic susceptibility and thickness of the magnetic material coating, the type of magnetic material must be selected in accordance with the size of abrasive grains so as to receive the necessary attractive force. However, even in the case of a coating of electroless nickel-phosphorus plating having a high phosphorus content and a low magnetic susceptibility, for example, the magnetic susceptibility may be increased to some extent by heat treatment. Also a multilayer coating of layers having different magnetic susceptibility is possible, for example, a layer having a low magnetic susceptibility being overlaid with a layer having a high magnetic susceptibility. Then the magnetic susceptibility of coated abrasive grains may be adjusted in an appropriate range, depending on a particular situation.

Figure 3:
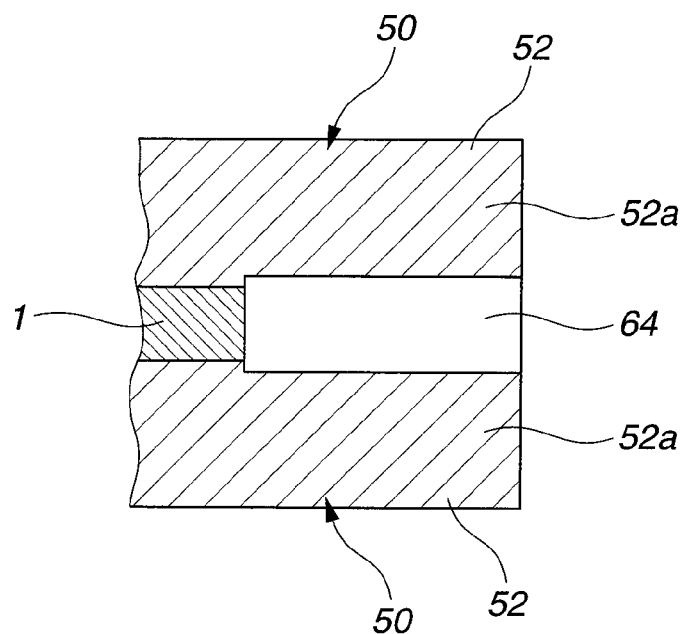
FIG. 3 is an enlarged cross-sectional view of a peripheral portion of the jig assembly.

The coated abrasive grains having a magnetic susceptibility $\chi$ of preferably at least 0.6, more preferably at least 1.0 ensure that the abrasive grains are quickly magnetized by a magnetic field produced around the outer periphery of the base as will be described later, and therefore, the abrasive grains are substantially equally magnetically attracted to the outer periphery of the base throughout a space 64 defined by a base 1 and permanent magnet-mounted jig members 50 in FIG. 3. If the magnetic susceptibility $\chi$ is less than 0.6, there is a risk that abrasive grains may not be fully attracted within the space, or abrasive grains may shed off during plating, and consequently, an abrasive layer (or blade section) may not be formed, or an abrasive layer containing voids may be formed and thus have a low mechanical strength.

It is noted that the magnetic susceptibility $\chi$ of abrasive grains is measured as follows. In a resin container having an outer diameter of 8 mm, an inner diameter of 6 mm and a height of about 5 mm, abrasive grains are thinly and uniformly distributed so as to form one or two layers. A paraffin film having a melting point of about 50° C. is laid on the grain layer. The container is placed in an oven where it is heated at 60° C. The container with the paraffin molten is closed with a lid and cooled down. Using a VSM, an initial magnetization curve ($4\pi I$—H) of the sample thus prepared is measured at a temperature of 24-25° C. A differential magnetic susceptibility is determined from a slope of the initial magnetization curve at the inflection point, giving the magnetic susceptibility $\chi$ of abrasive grains. Notably, the magnetic field is calibrated using the nickel standard sample, and the density of abrasive grains is a tapped bulk density.

The magnetic material is preferably coated to a thickness of at least 2.5 μm, which ensures that entire abrasive grains are fully coated even in the case of coating by plating. Where abrasive grains have an average particle size of 500 μm as the maximum of the preferred range, for example, the coating thickness may be at least 0.5% of the particle size. Such a coating provides a grain retaining force sufficient to prevent abrasive grains from falling off when the outer blade cutting wheel is used in cutting operation. Now that the type of coating magnetic material is properly selected, the coated abrasive grains are attracted to the outer periphery of the base under the magnetic field during the plating step without shedding off.

If the thickness of a magnetic coating is more than 100% of the average particle size of abrasive grains, a volume fraction of abrasive grains that do not effectively function in cutting operation when abrasive grains have an average particle size of 10 μm as the minimum of the preferred range, for example, becomes greater, resulting in a low cutting ability. It is noted that the metal bond for binding abrasive grains is a plating metal to be described later.

The outer blade cutting wheel is generally manufactured through the steps of preparing a base, binding abrasive grains to the base (or forming an abrasive layer or blade section), truing the size of the blade section, and dressing the blade section to expose abrasive grains face. The blade section is formed according to the invention by disposing at least two permanent magnet pieces having a remanence of at least 0.3 T each on the side surface of the base and inward of the base outer periphery or within a space located inward of the base outer periphery and axially extending a distance of at most 20 mm from the side surface of the base, to produce a magnetic field of at least 8 kA/m at the base outer periphery and within a space extending a distance of at most 10 mm from the base outer periphery, providing diamond and/or CBN grains pre-coated with a magnetic material such that the magnetic field may act on the diamond and/or CBN grains, causing the abrasive grains to be attracted and secured in proximity to the base outer periphery by the resultant attractive force, and electroplating or electroless plating on the base outer periphery with the abrasive grains attracted thereto whereby the abrasive grains are bound to the base outer periphery to form the blade section.

A jig assembly is used in forming the blade section. The jig assembly comprises a pair of jig members each comprising a cover of insulating material having a larger outer diameter than the base and at least one permanent magnet piece secured to the cover and disposed inward of the outer periphery of the base. The base is held between the jig members while plating.

Figure 2:
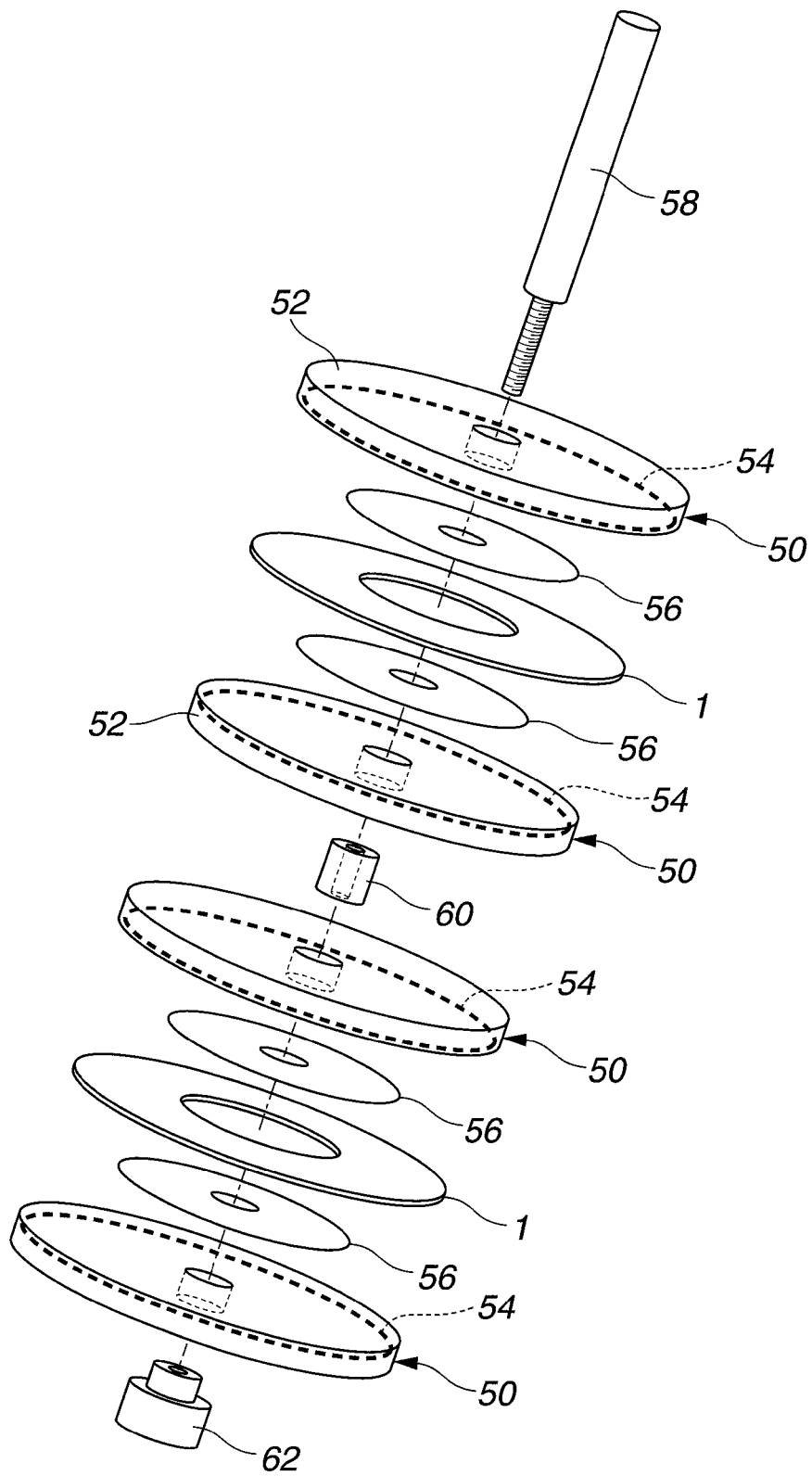
FIG. 2 is a perspective view of a jig assembly used in one embodiment of the invention.

FIG. 2 illustrates one exemplary jig assembly comprising a pair of jig members 50, 50. The jig member 50 includes a cover 52 of insulating material and one or more permanent magnet pieces 54 disposed in the cover. The base 1 is held between the jig members 50, 50. The permanent magnet pieces 54, 54 are preferably embedded in the covers 52, 52 although they may be disposed so as to abut against the base 1.

The permanent magnet pieces mounted in the jig assembly should have a magnetic force enough to attract abrasive grains to the base while a metal bond is deposited to bind the abrasive grains by a plating technique.

The necessary magnetic flux of permanent magnet pieces depends on the distance between the base outer periphery and the permanent magnet pieces, the magnetization and magnetic susceptibility of magnetic material with which abrasive grains are coated. The permanent magnet pieces typically have a remanence (or residual magnetic flux density) of at least 0.3 T and a coercive force of at least 0.2 MA/m, preferably a remanence of at least 0.6 T and a coercive force of at least 0.8 MA/m, and more preferably a remanence of at least 1.0 T and a coercive force of at least 1.0 MA/m.

Permanent magnet having a greater remanence is more convenient for locally attracting abrasive grains because a magnetic field having a greater gradient can be produced. Permanent magnet having a remanence of at least 0.3 T is used in order to prevent abrasive grains from moving away from the base by vibrations due to agitation of the plating solution and oscillation of the base and jig assembly during the plating step.

Permanent magnet having a greater coercive force ensures that abrasive grains are magnetically attracted to the base over a long time even when exposed to a hot plating solution, and allows for easy preparation of the jig assembly because of a greater freedom afforded to the position, shape and size of magnet pieces used. A permanent magnet having a greater coercive force may be selected among those permanent magnets having the desired remanence.

Permanent magnet may be coated with a suitable material which is selected in consideration of its potential contact with a plating liquid so as to minimize leaching out of the coating material in the plating liquid and replacement of metal species in the plating liquid by the coating material whereby the magnet is improved in corrosion resistance. In an embodiment wherein a metal bond is deposited from a Ni plating solution, permanent magnet may be coated with a metal such as Cu, Sn or Ni or an epoxy or acrylic resin.

The shape, size and number of permanent magnet pieces mounted in the jig assembly depend on the size of the cemented carbide base, and the desired position, direction and strength of the magnetic field. For example, when it is desired to uniformly bind abrasive grains to the outer periphery of the base, an annular magnet, piece or arcuate magnet pieces corresponding to the outer diameter of the base, or rectangular magnet pieces of several millimeters on one side are contiguously (without gaps) disposed along the periphery of the base. The number of magnetic pieces may be reduced for the purposes of reducing the cost of magnet pieces, and in this case, a plurality of magnet pieces may be equidistantly disposed at intervals. In some embodiments, depending on the remanence of magnet pieces, the interval between magnet pieces is increased so that magnetic material-coated abrasive grains in certain areas are attracted and in other areas not attracted, and as a result, abrasive grains in certain areas are bound and in other areas not bound, forming rectangular blade segments.

Figures 4A, 4B, 4C, 4D:
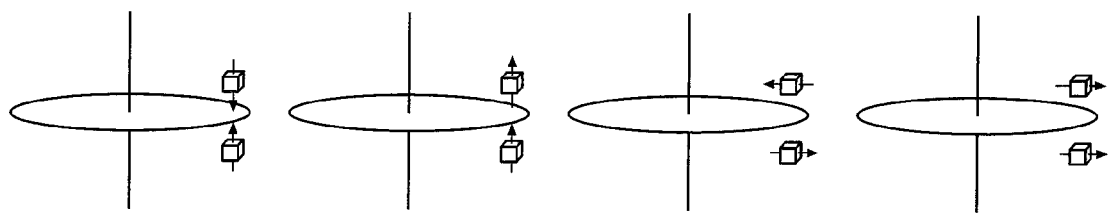
FIG. 4 illustrates the magnetization directions of permanent magnet pieces mounted in the jig assembly.
Figures 5A, 5B, 5C, 5D:
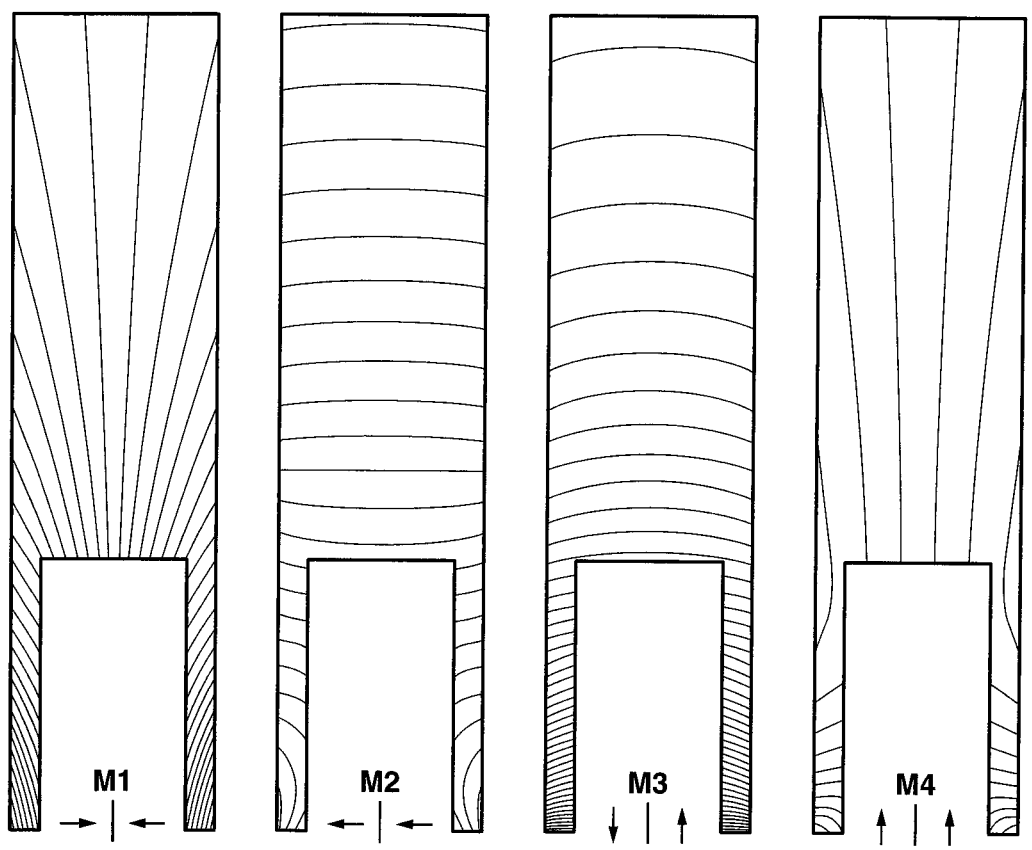
FIG. 5 is a simulation image of a magnetic field which is produced around the outer periphery of the base when the base is sandwiched between jig members, the magnetic field being depicted by lines of magnetic flux, M1 showing the magnetization directions of permanent magnet pieces sandwiching the base are axially opposed as in FIG. 4A, M2 showing the magnetization directions of permanent magnet pieces sandwiching the base are axially identical as in FIG. 4B, M3 showing the magnetization directions of permanent magnet pieces sandwiching the base are radially opposed as in FIG. 4C, and M4 showing the magnetization directions of permanent magnet pieces sandwiching the base are radially identical as in FIG. 4D.

When permanent magnet pieces are disposed as described above, abrasive grains may be oriented and bound in a particular direction, for example, a radial or axial direction of the base by changing the combination of magnetization directions of permanent magnet pieces. For example, when it is desired to orient abrasive grains in a radial direction of the base, permanent magnet pieces are disposed as shown in FIG. 4(1) so that N and N poles are opposed or S and S poles are opposed, with the base interposed therebetween, that is, the magnetization directions of permanent magnet pieces on the opposite sides of the base are straight opposed in the axial direction of the base; or as shown in FIG. 4(4) so that the magnetization directions of permanent magnet pieces on the opposite sides of the base are identical and parallel to the radial direction of the base. In these arrangements, lines of magnetic flux are divergent from the base or convergent to the base, as shown in FIG. 5(1) or 5(4), and the magnetic material-coated abrasive grains are attracted to the base along the lines of magnetic flux.

When it is desired to orient abrasive grains in an axial direction of the base, permanent magnet pieces are disposed as shown in FIG. 4(2) so that N and S poles are opposed, with the base interposed therebetween, that is, the magnetization directions of permanent magnet pieces on the opposite sides of the base are identical in the axial direction of the base; or as shown in FIG. 4(3) so that the magnetization directions of permanent magnet pieces on the opposite sides of the base are opposed and parallel to the radial direction of the base. In these arrangements, lines of magnetic flux are parallel to the peripheral surface of the base, as shown in FIGS. 5(2) and 5(3), and the magnetic material-coated abrasive grains are attracted to the base along the lines of magnetic flux.

In an embodiment wherein permanent magnet pieces are disposed concentric with the center of the jig member and equidistantly spaced apart, there may occur a combination where the magnet pieces on opposite sides are symmetric with respect to the base and a combination where the magnet piece on one side is aligned with the space on the other side. These combinations are included in the foregoing combinations and such a combination may be used if desired for a particular application.

As discussed above, a variety of magnetic fields may be produced around the outer periphery of the base by selecting the combination of position and magnetization direction of permanent magnet pieces mounted to the jig members between which the base is sandwiched. By repeating a test of disposing permanent magnet pieces and analyzing a magnetic field, a proper combination is determined so as to produce a magnetic field of at least 8 kA/m, preferably at least 40 kA/m at the outer periphery of the base and within a space extending a distance of at most 10 mm from the outer periphery. If the strength of a magnetic field is less than 8 kA/m, the magnetic force to attract the magnetic material-coated abrasive grains is short, and if plating is effected in this state, abrasive grains may move during the plating, resulting in a blade section containing many voids or having abrasive grains bound in a dendritic pattern. In either case, the blade section has larger than desired size. As a result, the blade section can be chipped or separated during truing and dressing steps, or the truing and dressing steps take a longer time, and the manufacture cost is increased.

Preferably the position of permanent magnet is closer to the portion of the base to which abrasive grains are to be attracted. Briefly stated, the position is preferably on the side surface of the base and inward of the base outer periphery or within a space located inward of the base outer periphery and extending a distance of at most 20 mm, more preferably at most 10 mm from the side surface of the base. By disposing at least two permanent magnet pieces having a remanence of at least 0.3 T at specific positions within the range so that all or part of the magnet piece may fall in the range (at least one per jig member), a magnetic field of at least 8 kA/m can be produced at the base outer periphery and within a space extending a distance of at most 10 mm from the base outer periphery. Independent of whether the base is made of a material having a high saturation magnetization and capable of inducing a magnetic force such as alloy tool steel or high-speed steel, or a material having a low saturation magnetization and less capable of magnetic induction such as cemented carbide, a magnetic field having a magnetic flux induced across the base outer periphery as shown by lines of magnetic flux on magnetic field analysis in FIG. 5 can be produced at the base outer periphery. When the magnetic material-coated abrasive grains are carried in the magnetic field, the coating is magnetized and as a result, the abrasive grains are attracted and retained to the outer periphery of the base.

If the position of magnet is outside the range, for example, the position is outward of and close to the outer periphery of the base, e.g., at a spacing of 0.5 mm outward of the outer periphery of the base, the magnetic field produced in proximity to the outer periphery of the base has a high strength, but tends to include a region where the gradient of the magnetic field is reversed, and then abrasive grains behave like moving afloat from the base, and tend to shed off. If the position of magnet is inward of the outer periphery of the base and spaced a distance of more than 20 mm from the outer periphery of the base, then the magnetic field produced at the base outer periphery and within a space extending a distance of at most 10 mm from the base outer periphery may have a strength of less than 8 kA/m, providing a short force to magnetically attract the abrasive grains. In such a case, the magnetic field strength may be increased by enlarging the size of magnet, which is less practical because a jig assembly of a larger size is required for mounting the magnet.

The jig members have a shape correspond to the shape of the base. The jig members are of such a size that the permanent magnet is located at the desired position relative to the base when the base is sandwiched between the jig members. In an example wherein the base has an outer diameter of 125 mm and a thickness of 0.3 mm, and permanent magnet pieces are dimensioned 2.5 mm (L) by 2 mm (W) by 1.5 mm (t), discs having an outer diameter of at least 125 mm and a thickness of about 10 mm are used as the jig member.

Specifically, the outer diameter of the jig member is equal to or more than (OD+2H) wherein OD is the outer diameter of the base and H is the height of the abrasive layer, so as to insure a certain height (or radial protrusion extent) of the abrasive layer. The thickness of the jig member varies with its material and is determined to provide a strength sufficient to prevent the member from being deflected by an abrupt temperature change upon entry into and removal from the hot plating solution or the like. A peripheral portion of the jig member that will come in contact with abrasive grains may be thinner than the remaining portion so that the abrasive layer may have an axial protrusion extent (T3 in FIG. 1) in the thickness direction of the base. Alternatively, the jig member may have an equal thickness throughout its diameter while a masking tape having a thickness equal to the axial protrusion extent is attached to the remaining portion.

The material of the jig members is preferably an insulating material which is free from deposition by plating because the jig assembly in which the base is clamped between the jib members is immersed in a plating solution from which a metal bond is deposited on the base. More desirably the jig member material has chemical resistance, heat resistance up to about 90° C., and heat shock resistance capable of maintaining dimensions unchanged against an abrupt temperature change upon entry into and removal from the hot plating solution. Moreover, the jig member material should desirably have sufficient dimensional stability to inhibit a possibility that when immersed in the hot plating solution, the jig-member is deflected due to internal stresses accumulated during molding and working, to produce a gap between the jig member and the base. Of course, the jig member material must be workable so that it may be worked at any desired position and a high accuracy to form grooves for receiving permanent magnet pieces, without fissures or cracks.

Examples of the jig member material which can be used herein include engineering plastics such as polyacetal or polyoxymethylene (POM), polyetheretherketone (PEEK), polyphenylenesulfide (PPS), polyarylate resin (PAR), polysulfone (PSF) and polyethersulfone (PES), and ceramics such as alumina. Of these, POM is preferred because it has a good profile of chemical resistance, dimensional stability and workability, and is commercially available at a reasonable price.

Jig members are prepared by using a material as mentioned above, determining dimensions including thickness in consideration of mechanical strength, and working to form a groove for receiving permanent magnet pieces and optionally a power supply electrode which is necessary when electroplating is carried out. A pair of jig members thus prepared are assembled and combined with a base into an integral assembly. Upon assembly, an electrode for conducting electricity to the base for enabling electroplating may be used to fasten the jig members and the base together. This establishes both electric connection and mechanical fastening and makes the overall structure compact. Of course, it is preferred for more efficient manufacture that a plurality of jig assemblies be joined as shown in FIG. 2 so as to enable simultaneous plating on a plurality of bases.

Referring to FIG. 2, electroplating cathodes 56, 56 also serving as base holders are mounted at the center of covers 52, 52. The cathodes 56, 56 are in contact with a conductive support shaft 58 for supporting and securing a pair of jig members 50, 50 so that electricity is conducted from shaft 58 to cathodes 56, 56. In FIG. 2, two pairs of jig members 50, 50 are mounted on support shaft 58 and spaced apart a predetermined distance, using a joint 60 and an end cap 62. The jig assembly shown in FIG. 2 is intended for electroplating. In the case of electroless plating, the cathodes are unnecessary, and instead, non-conductive base holders may be used and the support shaft may not be necessarily conductive.

Now that the base is sandwiched between a pair of jig members to define a space by the jig members and the outer periphery of the base, a suitable amount of magnetic material-coated abrasive grains is weighed in a balance or the like, and supplied so that the grains are attracted and held in the space. As shown in FIG. 3, base 1 is sandwiched between a pair of jig members 50, 50 so that extensions 52a, 52a of jig members 50, 50 or covers 52, 52 beyond base 1 define a space 64 with the outer periphery of base 1. Within space 64, abrasive grains are magnetically attracted and held in place.

The amount of abrasive grains attracted and held in the space depends on the outer diameter and thickness of the base, the size of abrasive grains, the height and thickness of the blade section to be formed. It is noted that the procedure of holding abrasive grains and plating is preferably repeated several times so as to provide an equal population per unit volume of abrasive grains at any position over the circumference of the base and to firmly bind abrasive grains by the plating method.

Preferably the blade section contains abrasive grains in a fraction of 10 to 80% by volume, and more preferably 15 to 75% by volume. Less than 10 vol % means a less fraction of abrasive grains contributing to cutting whereas more than 80 vol % of abrasive grains may increase unwanted loading during the cutting operation. Either situation increases resistance during the cutting operation and so the cutting speed must be reduced. Depending on a particular application, the volume fraction of abrasive grains is controlled by admixing a suitable ingredient other than abrasive grains.

Figure 1C:
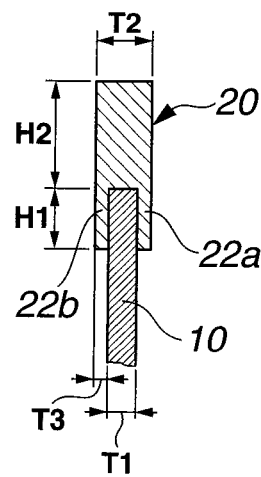

As shown in FIG. 1C, the blade section 20 consists of a pair of clamp legs 22a, 22b which clamp the outer peripheral portion of the base 10 therebetween in an axial direction and a body (20) which protrudes radially outward from the outer periphery of the base 10. (This division is for convenience of description because the legs and the body are integral to form the blade section.) Preferably the thickness T2 of the blade section 20 is greater than the thickness T1 of the base 10. Preferably the space 64 is defined in this way (though not shown so in FIG. 3).

More specifically, the clamp legs 22a, 22b of the blade section 20 which clamp the outer peripheral portion of the base 10 therebetween each preferably have a length H1 of 0.1 to 10 mm, and more preferably 0.5 to 5 mm. The legs 22a, 22b each preferably have a thickness T3 of at least 5 µm (=0.005 mm), more preferably 5 to 2,000 µm, and even more preferably 10 to 1,000 μm. Then the total thickness of legs 22a, 22b is preferably at least 0.01 mm, more preferably 0.01 to 4 mm, and even more preferably 0.02 to 2 mm. The blade section 20 is thicker than the base 10 by this total thickness. If the length Hi of clamp legs 22a, 22b is less than 0.1 mm, they are still effective for preventing the peripheral portion of the base from being chipped or cracked, but less effective for reinforcing the base and sometimes fail to prevent the base from being deformed by the cutting resistance. If the length H1 exceeds 10 mm, reinforcement of the base is made at the sacrifice of expense. If the thickness T3 of clamp leg is less than 5 μm, such thin legs may fail to enhance the mechanical strength of the base or to effectively discharge the swarf sludge.

As shown in FIGS. 6A to 6D, the clamp legs 22a, 22b may consist of a metal bond 24 and abrasive grains 26 (FIG. 6A), consist of metal bond 24 (FIG. 6B), or include an underlying layer consisting of metal bond 24 covering the base 10 and an overlying layer consisting of metal bond 24 and abrasive grains 26 (FIG. 6C). The metal bond may be further deposited so as to cover the entire structure of FIG. 6C to form a structure as shown in FIG. 6D, resulting in the blade section having a higher strength.

In the embodiments of FIGS. 6B to 6D, the portions of clamp legs 22a, 22b which are contiguous to the base are formed solely of the metal bond. Herein, plating is first carried out while the base is masked, but those portions where clamp legs are to be formed are exposed. Thereafter, the base is assembled with the jig members and the space 64 is filled with abrasive grains. In this state, plating is effected. After abrasive grains are electrodeposited, the base 1 is masked with masking members (typically covers 52, 52 shown in FIG. 2) having such an outer diameter that the electrodeposited portion is exposed, and plating is effected again. Then a layer consisting of the metal bond is formed as the outermost layer of the blade section as shown in FIG. 6D.

The body of blade section 20 which protrudes radially outward beyond the periphery of the base 10 has a height or radial protrusion extent (H2 in FIG. 1C) which is preferably 0.1 to 10 mm, and more preferably 0.3 to 8 mm, depending on the size of abrasive grains to be bound. If the body height H2 is less than 0.1 mm, the blade section may be consumed within a short time by impacts and wears during the cutting operation, leading to a cutting wheel with a short lifetime. If the body height H2 exceeds 10 mm, the blade section may become susceptible to deformation, though dependent on the blade thickness (T2 in FIG. 1C), resulting in cut magnet pieces with wavy cut surfaces and hence, worsening dimensional accuracy. The body of blade section 20 consists essentially of metal bond 24 and abrasive grains 26.

The metal bond is a plating metal, preferably at least one metal selected from Ni, Fe, Co, Cu, and Sn, an alloy thereof, or an alloy of such a metal with one or both of P and Mn. By plating, the metal is deposited on the base while binding abrasive grains therewith.

The method of depositing the metal bond by plating is generally classified into two, an electroplating method and an electroless plating method. Herein, either the electroplating method which is easy to control internal stresses remaining in the metal bond and needs low production costs or the electroless plating method which ensures relatively uniform deposition of the metal bond where the plating solution can penetrate may be used alone or in combination, depending on a particular application.

In case of single metal plating such as copper or nickel plating, typically electroplating in a nickel sulfamate plating bath may be effected so as to control the stress in the plating film by selecting the concentration of the active ingredient or nickel sulfamate, the current density during plating, and the temperature of the plating bath in appropriate ranges, and adding an organic additive such as o-benzenesulfonimide or p-toluenesulfonamide, or an element such as Zn, S or Mn.

Besides, in alloy plating such as Ni—Fe alloy, Ni—Mn alloy, Ni—P alloy, Ni—Co alloy or Ni—Sn alloy, the stress in the plating film may be controlled by selecting the content of Fe, Mn, P, Co or Sn in the alloy, the temperature of the plating bath, and other parameters in appropriate ranges. In the case of alloy plating, addition of organic additives may, of course, be effective for stress control.

Plating may be carried out by any well-known technique using a plating bath well known for depositing the above-listed single metal or alloy and ordinary plating conditions commonly used for that bath.

Examples of the preferred electroplating bath include a sulfamate Watts nickel electroplating bath containing 250 to 600 g/L of nickel sulfamate, 50 to 200 g/L of nickel sulfate, 5 to 70 g/L of nickel chloride, 20 to 40 g/L of boric acid, and an appropriate amount of o-benzenesulfonimide; and a copper pyrophosphate electroplating bath containing 30 to 150 g/L of copper pyrophosphate, 100 to 450 g/L of potassium pyrophosphate, 1 to 20 mL/L of 25% aqueous ammonia, and 5 to 20 g/L of potassium nitrate. One exemplary electroless plating solution is a nickel-phosphorus alloy electroless plating solution containing 10 to 50 g/L of nickel sulfate, 10 to 50 g/L of sodium hypophosphite, 10 to 30 g/L of sodium acetate, 5 to 30 g/L of sodium citrate, and an appropriate amount of thiourea.

The above methods facilitate both the attachment of diamond grains, CBN grains or a mixture of diamond and CBN grains to the periphery of the base in dimensions close to the final dimensions at a high accuracy and the enhancement of mechanical strength of the thin base at the same time.

On use of the outer blade cutting wheel of the invention, various workpieces may be cut thereby. Typical workpieces include R—Co rare earth sintered magnets and R—Fe—B rare earth sintered magnets wherein R is at least one of rare earth elements inclusive of Y. These magnets are prepared as follows.

R—Co rare earth sintered magnets include $RCo_5$ and $R_2Co_{17}$ systems. Of these, the $R_2Co_{17}$ magnets have a composition (in % by weight) comprising 20-28% R, 5-30% Fe, 3-10% Cu, 1-5% Zr, and the balance of Co. They are prepared by weighing source materials in such a ratio, melting them, casting the melt, and finely pulverizing the alloy into an average particle size of 1-20 μm, yielding a $R_2Co_{17}$ magnet powder. The powder is then compacted in a magnetic field and sintered at 1,100-1,250° C. for 0.5-5 hours, followed by solution treatment at a temperature lower than the sintering temperature by 0-50° C. for 0.5-5 hours, and aging treatment of holding at 700-950° C. for a certain time and subsequent cooling.

R—Fe—B rare earth sintered magnets have a composition (in % by weight) comprising 5-40% R, 50-90% Fe, and 0.2-8% B. An additive element or elements may be added thereto for improving magnetic properties and corrosion resistance, the additive elements being selected from C, Al, Si, Ti, V, Cr, Mn, Co, Ni, Cu, Zn, Ga, Zr, Nb, Mo, Ag, Sn, Hf, Ta, W, etc. The amount of additive element is up to 30% by weight for Co, and up to 8% by weight for the other elements. The magnets are prepared by weighing source materials in such a ratio, melting them, casting the melt, and finely pulverizing the alloy into an average particle size of 1-20 μm, yielding a R—Fe—B magnet powder. The powder is then compacted in a magnetic field and sintered at 1,000-1,200° C. for 0.5-5 hours, followed by aging treatment of holding at 400-1,000° C. for a certain time and subsequent cooling.

EXAMPLE

Examples of the invention are given below by way of illustration and not by way of limitation.

Example 1

A cemented carbide consisting of 90 wt % WC and 10 wt % Co was machined into an annular thin disc having an outer diameter of 125 mm, an inner diameter of 40 mm, and a Young's modulus of 600 GPa and a saturation magnetization of 127 kA/m (0.16 T).

The base was masked with adhesive tape so that only a circumferential region of either surface extending 1.0 mm inward from the outer periphery was exposed. The base was immersed in a commercially available aqueous alkaline solution at 40° C. for 10 minutes for degreasing, washed with water, and immersed in an aqueous solution of 30-80 g/L of sodium pyrophosphate at 50° C. where electrolysis was effected at a current density of 2-8 A/dm$^2$.

The cemented carbide base was ultrasonic washed in deionized water and immersed in a sulfamate Watts nickel electroplating bath at 50° C. where electricity was conducted at a current density of 5-20 A/dm$^2$ for electroplating an underlayer. The masking tape was peeled off, and the base was washed with water.

A pair of jig members of POM having an outer diameter of 128 mm and a thickness of 10 mm were provided with an annular groove having an outer diameter of 123 mm, an inner diameter of 119 mm and a depth of 1.5 mm. In each groove, 75 permanent magnet pieces of 2.5 mm (L) by 2 mm (W) by 1.5 mm (t) (Shin-Etsu Rare Earth Magnet N39UH, Br 1.25 T) were equidistantly disposed so as to provide opposed magnetization directions as shown in FIG. 4A whereupon the grooves were backfilled. The base was sandwiched between the jig members. At this point, the magnet pieces were disposed on the side surfaces of the base and spaced 1 mm inward from the outer periphery of the base. A magnetic field produced in a space extending 10 mm from the outer periphery of the base was analyzed to have a strength of at least 8 kA/m (0.01 T).

Diamond grains were previously plated with NiP so as to have a magnetic susceptibility $\chi$ of 1.0 and an average particle size of 130 µm. The NiP-plated diamond grains, 0.4 g, were supplied to and magnetically attracted in the space between the jig members and the base so as to distribute uniformly throughout the circumference.

The jig assembly with abrasive grains magnetically attracted was immersed in a sulfamate Watts nickel electroplating bath at 50° C. where electricity was conducted at a current density of 5-20 A/dm$^2$ for electroplating. The assembly was washed with water.

Again, 0.4 g of plated diamond grains were magnetically attracted in the space, whereupon plating was similarly effected, followed by water washing.

The jig assembly was then exchanged to another jig assembly from which the electroplated blade section was exposed. The assembly was immersed in a sulfamate Watts nickel electroplating bath at 50° C. where electricity was conducted at a current density of 5-20 A/dm$^2$ for electroplating overall the blade section. This was followed by water washing.

There was obtained an outer blade cutting wheel in which the base was provided on the periphery with the blade section (abrasive layer) as shown in FIG. 6D. It was ground by a surface grinding machine so that the abrasive layer protruded 50 µm (T3) from either side surface of the cemented carbide base, and dressed, obtaining an abrasive grain-electroplated outer blade cutting wheel having a thickness (T2) of 0.4 mm.

Figure 7:
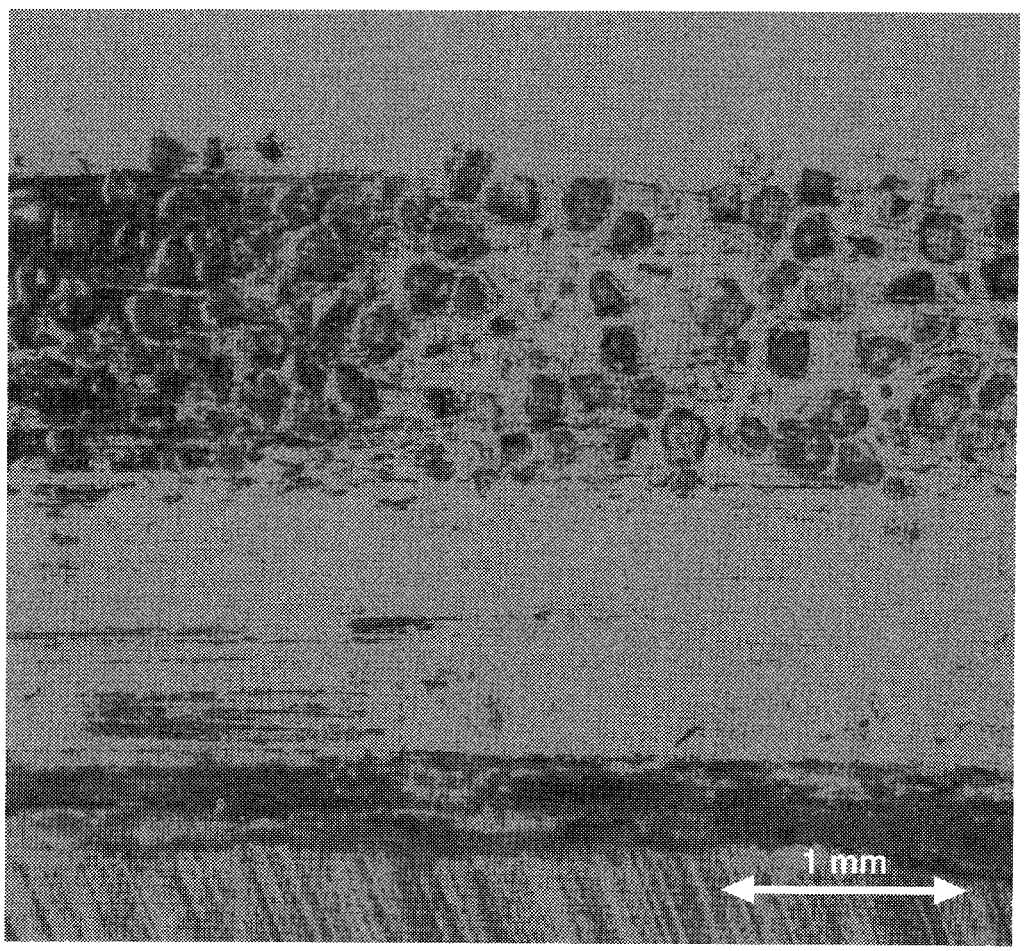
FIG. 7 is a photomicrograph of a blade section of an outer blade cutting wheel in Example 1.

FIG. 7 is a photomicrograph of the blade section.

Example 2

A cemented carbide consisting of 90 wt % WC and 10 wt % Co was machined into an annular thin disc having an outer diameter of 125 mm, an inner diameter of 40 mm, and a thickness of 0.3 mm, which served as a base. It had a Young's modulus of 600 GPa and a saturation magnetization of 127 kA/m (0.16 T).

The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30-80 g/L of sodium pyrophosphate at 50° C. where electrolysis was effected at a current density of 2-8 A/dm$^2$.

The cemented carbide base was ultrasonic washed in deionized water and immersed in a sulfamate Watts nickel electroplating bath at 50° C. where electricity was conducted at a current density of 5-20 A/dm$^2$ for electroplating an underlayer. The masking tape was peeled off, and the base was washed with water.

A pair of jig members of POM having an outer diameter of 128 mm and a thickness of 10 mm were provided with an annular groove having an outer diameter of 122 mm, an inner diameter of 118 mm and a depth of 1.5 mm. In each groove, 105 permanent magnet pieces of 1.8 mm (L) by 2 mm (W) by 1.5 mm (t) (Shin-Etsu Rare Earth Magnet N32Z, Br 1.14 T) were equidistantly disposed so as to provide identical magnetization directions as shown in FIG. 4B whereupon the grooves were backfilled. The base was sandwiched between the jig members. At this point, the magnet pieces were disposed on the side surfaces of the base and spaced 1.5 mm inward from the outer periphery of the base. A magnetic field produced in a space extending 10 mm from the outer periphery of the base was analyzed to have a strength of at least 16 kA/m (0.02 T).

NiP-plated diamond grains having a magnetic susceptibility $\chi$ of 1.0 and an average particle size of 130 µm, 0.4 g, were supplied to and magnetically attracted in the space between the jig members and the base so as to distribute uniformly throughout the circumference.

The jig assembly with abrasive grains magnetically attracted was immersed in a sulfamate Watts nickel electroplating bath at 50° C. where electricity was conducted at a current density of 5-20 A/dm$^2$ for electroplating. After water washing, the base was removed.

There was obtained an outer blade cutting wheel in which the base was provided on the periphery with the blade section (abrasive layer). It was ground by a surface grinding machine so that the abrasive layer protruded 50 µm from either side surface of the cemented carbide base, and dressed, obtaining an abrasive grain-electroplated outer blade cutting wheel having a thickness (T2) of 0.4 mm.

Example 3

A cemented carbide consisting of 90 wt % WC and 10 wt % Co was machined into an annular thin disc having an outer diameter of 125 mm, an inner diameter of 40 mm, and a thickness of 0.3 mm, which served as a base. It had a Young's modulus of 600 GPa and a saturation magnetization of 127 kA/m (0.16 T).

The base was masked with adhesive tape so that only a circumferential region of either surface extending 1.0 mm inward from the outer periphery was exposed. The base was immersed in a commercially available aqueous alkaline solution at 40° C. for 10 minutes for degreasing, washed with water, and immersed in an aqueous solution of 30-80 g/L of sodium pyrophosphate at 50° C. where electrolysis was effected at a current density of 2-8 A/dm$^2$.

The cemented carbide base was ultrasonic washed in deionized water and immersed in a sulfamate Watts nickel electroplating bath at 50° C. where electricity was conducted at a current density of 5-20 A/dm$^2$ for electroplating an underlayer. The masking tape was peeled off, and the base was washed with water.

A pair of jig members of POM having an outer diameter of 128 mm and a thickness of 10 mm were provided with an annular groove having an outer diameter of 123 mm, an inner diameter of 119 mm and a depth of 1.5 mm. In each groove, 75 permanent magnet pieces of 2.5 mm (L) by 2 mm (W) by 1.5 mm (t) (Shin-Etsu Rare Earth Magnet N39UH, Br 1.25 T) were equidistantly disposed so as to provide magnetization directions as shown in FIG. 4C whereupon the grooves were backfilled. The base was sandwiched between the jig members. At this point, the magnet pieces were disposed on the side surfaces of the base and spaced 1 mm inward from the outer periphery of the base. A magnetic field produced in a space extending 10 mm from the outer periphery of the base was analyzed to have a strength of at least 16 kA/m (0.02 T).

NiP-plated diamond grains having a magnetic susceptibility $\chi$ of 1.0 and an average particle size of 130 µm, 0.4 g, were supplied to and magnetically attracted in the space between the jig members and the base so as to distribute uniformly throughout the circumference.

The jig assembly with abrasive grains magnetically attracted was immersed in a copper pyrophosphate electroplating bath at 40° C. where electricity was conducted at a current density of 1-20 A/dm$^2$ for electroplating. After water washing, the base was removed from the jig assembly.

There was obtained an outer blade cutting wheel in which the base was provided on the periphery with the blade section (abrasive layer). It was ground by a surface grinding machine so that the abrasive layer protruded 50 µm from either side surface of the cemented carbide base, and dressed, obtaining an abrasive grain-electroplated outer blade cutting wheel having a thickness (T2) of 0.4 mm.

Example 4

A cemented carbide consisting of 95 wt % WC and 5 wt % Co was machined into an annular thin disc having an outer diameter of 125 mm, an inner diameter of 40 mm, and a thickness of 0.3 mm, which served as a base. It had a Young's modulus of 580 GPa and a saturation magnetization of 40 kA/m (0.05 T).

The base was masked with adhesive tape so that only a circumferential region of either surface extending 1.0 mm inward from the outer periphery was exposed. The base was immersed in a commercially available aqueous alkaline solution at 40° C. for 10 minutes for degreasing, washed with water, and immersed in an aqueous solution of 30-80 g/L of sodium pyrophosphate at 50° C. where electrolysis was effected at a current density of 2-8 A/dm$^2$.

The cemented carbide base was ultrasonic washed in deionized water and immersed in a sulfamate Watts nickel electroplating bath at 50° C. where electricity was conducted at a current density of 5-20 A/dm$^2$ for electroplating an underlayer. The masking tape was peeled off, and the base was washed with water.

A pair of jig members of POM having an outer diameter of 128 mm and a thickness of 25 mm were provided with an annular groove having an outer diameter of 125 mm, an inner diameter of 120 mm and a depth of 6 mm. In each groove, 32 arcuate permanent magnet pieces having an outer diameter of 125 mm, an outer arcuate length of 12.2 mm, an inner diameter of 120 mm, an inner arcuate length of 11.7 mm, and a thickness of 3.0 mm (Shin-Etsu Rare Earth Magnet N39UH, Br 1.25 T) were contiguously disposed so as to provide magnetization directions as shown in FIG. 4D whereupon the grooves were backfilled. The base was sandwiched between the jig members. At this point, the magnet pieces were axially spaced 19 mm from the outer periphery of the base. A magnetic field produced in a space extending 10 mm from the outer periphery of the base was analyzed to have a strength of at least 8 kA/m (0.01 T).

NiP-plated diamond grains having a magnetic susceptibility $\chi$ of 1.0 and an average particle size of 130 µm, 0.2 g, were supplied to and magnetically attracted in the space between the jig members and the base so as to distribute uniformly throughout the circumference.

The jig assembly with abrasive grains magnetically attracted was immersed in a nickel-phosphorus alloy electroless plating bath at 80° C. The plating was followed by water washing. Again, 0.2 g of NiP-plated diamond grains having a magnetic susceptibility $\chi$ of 1.0 and an average particle size of 130 µm were magnetically attracted in the space so as to distribute uniformly throughout the circumference, and electroless plating of nickel-phosphorus alloy was similarly effected. After plating and water washing, the base was removed from the jig assembly.

There was obtained an outer blade cutting wheel in which the base was provided on the periphery with the blade section (abrasive layer). It was ground by a surface grinding machine so that the abrasive layer protruded 50 µm from either side surface of the cemented carbide base, and dressed, obtaining an abrasive grain-electroplated outer blade cutting wheel having a thickness (T2) of 0.4 mm.

All the cutting wheels of Examples 1 to 4 were suited for cutting rare earth sintered magnet blocks.

Comparative Example 1

A cemented carbide consisting of 90 wt % WC and 10 wt % Co was machined into an annular thin disc having an outer diameter of 125 mm, an inner diameter of 40 mm, and a thickness of 0.3 mm, which served as a base.

The base was masked with adhesive tape so that only a circumferential region of either surface extending 1.5 mm inward from the outer periphery was exposed. The base was immersed in a commercially available aqueous alkaline solution at 40° C. for 10 minutes for degreasing, washed with water, and immersed in an aqueous solution of 30-80 g/L of sodium pyrophosphate at 50° C. where electrolysis was effected at a current density of 2-8 A/dm$^2$.

The cemented carbide base was ultrasonic washed in deionized water and immersed in a sulfamate Watts nickel electroplating bath at 50° C. where electricity was conducted at a current density of 5-20 A/dm$^2$ for electroplating an underlayer.

The base was attached to a power supply jig so that the nickel underlayer was exposed and mounted in a jig provided with a channel where a blade section was to be formed. The channel was filled with Ni-plated diamond grains having an average particle size of 130 μm. The jig which was held horizontally was moderately immersed in a sulfamate Watts nickel electroplating bath where electricity was conducted at a current density of 1-10 A/dm² for electroplating.

The jig together with the base was taken out of the bath. The base was turned back, and mounted again in a jig provided with a channel where a blade section was to be formed, followed by similar electroplating by electric conduction in a range of 1-10 A/dm².

The abrasive grain-electroplated cemented carbide base having the power supply jig attached was immersed in a sulfamate Watts nickel electroplating bath at 50° C. where electricity was conducted at a current density of 5-20 A/dm² for electroplating overall the electroplated section, followed by water washing.

The resulting outer blade cutting wheel was ground by a surface grinding machine so that the abrasive layer protruded 50 μm from either side surface of the cemented carbide base, and dressed, obtaining an abrasive grain-electroplated outer blade cutting wheel having a thickness (T2) of 0.4 mm.

Comparative Example 2

A cemented carbide consisting of 90 wt % WC and 10 wt % Co was machined into an annular thin disc having an outer diameter of 125 mm, an inner diameter of 40 mm, and a thickness of 0.4 mm, which served as a base. The base was placed in a mold, and the outer peripheral cavity was filled with a mixture of 75% by volume of a powdered phenolic resin as a resin bond and 25% by volume of diamond grains having an average particle size of 130 μm. The mixture was pressure molded about the base and heated in the mold at 180° C. for 2 hours for curing. After cooling, the base was taken out of the mold.

The resulting outer blade cutting wheel was ground by a surface grinding machine so that the abrasive layer protruded 50 μm from either side surface of the cemented carbide base, and dressed, obtaining an abrasive grain-electroplated outer blade cutting wheel having a thickness (T2) of 0.5 mm.

Table 1 reports the manufacture yield of outer blade cutting wheels manufactured in Examples 1 to 4 and Comparative Example 1.

When plating is effected on a base to form a plated cutting wheel, the "plating yield" in percentage is the number of acceptably plated cutting wheels (10 wheels in Examples and 5 wheels in Comparative Example) divided by the total number of bases plated until the acceptably plated cutting wheels were obtained. When an abrasive layer is ground and dressed into a finish wheel, the "working yield" in percentage is the number of acceptably worked cutting wheels (10 wheels in Examples and 5 wheels in Comparative Example) divided by the number of acceptably plated cutting wheels which are ground and dressed. The "total yield" is the plating yield multiplied by the working yield, and represents the overall yield until acceptable cutting wheels (10 wheels in Examples and 5 wheels in Comparative Example) are obtained.

TABLE 1

| | Example | | | | Comparative Example (unit: %) |
|---|---|---|---|---|---|
| | 1 | 2 | 3 | 4 | 1 |
| Plating yield | 100.0 | 91.7 | 91.7 | 85.7 | 52.0 |
| Working yield | 90.9 | 90.9 | 90.9 | 83.3 | 38.4 |
| Total yield | 90.9 | 83.4 | 83.4 | 71.4 | 20.0 |

As seen from Table 1, the yields of Examples which differ in a certain range are improved over Comparative Example.

Table 2 reports the thickness (mm) and radial protrusion extent (mm) of the blade sections of the cutting wheels immediately after manufacture (immediately after binding of abrasive grains) in Examples 1 to 4 and Comparative Example 1 (10 wheels in Examples 1 to 4 and 5 wheels in Comparative Example 1).

It is noted that the thickness, axial protrusion extent, and radial protrusion extent of a blade section each are determined by measuring 8 values at intervals of 45° per annular blade section and computing an average. The thickness (T2 in FIG. 1) of a blade section is measured by clamping the blade section with a commercially available micrometer having a probe with a diameter of 5 mm. The radial protrusion extent (H2 in FIG. 1) of a blade section is determined by horizontally placing the blade section on the table of a commercially available non-contact coordinate measuring machine, setting work coordinates with the origin at the center of the bore, and measuring the distance between the outer periphery of the base which is previously measured and the outer periphery of the blade section disposed around the base outer periphery.

TABLE 2

| | Example | | | | Comparative (unit: mm) |
|---|---|---|---|---|---|
| | 1 | 2 | 3 | 4 | Example 1 |
| Thickness | 0.621 | 0.577 | 0.562 | 0.471 | 0.850 |
| | 0.587 | 0.524 | 0.570 | 0.487 | 0.760 |
| | 0.654 | 0.553 | 0.559 | 0.438 | 0.890 |
| | 0.569 | 0.582 | 0.592 | 0.502 | 1.050 |
| | 0.608 | 0.546 | 0.546 | 0.494 | 1.120 |
| | 0.588 | 0.501 | 0.582 | 0.488 | 0.950 |
| | 0.596 | 0.529 | 0.537 | 0.473 | 0.880 |
| | 0.556 | 0.587 | 0.581 | 0.503 | 0.780 |
| | 0.593 | 0.541 | 0.513 | 0.444 | 0.940 |
| | 0.611 | 0.561 | 0.524 | 0.475 | 1.030 |
| Average | 0.598 | 0.550 | 0.557 | 0.478 | 0.925 |
| Maximum-minimum | 0.10 | 0.09 | 0.08 | 0.07 | 0.36 |
| Radial protrusion extent | 1.212 | 0.601 | 0.531 | 0.558 | 1.500 |
| | 1.182 | 0.498 | 0.562 | 0.541 | 1.200 |
| | 1.154 | 0.541 | 0.508 | 0.590 | 1.060 |
| | 1.108 | 0.623 | 0.616 | 0.620 | 0.800 |
| | 1.221 | 0.554 | 0.601 | 0.560 | 1.100 |
| | 1.248 | 0.581 | 0.576 | 0.560 | 1.240 |
| | 1.076 | 0.517 | 0.552 | 0.575 | 1.170 |
| | 1.155 | 0.608 | 0.614 | 0.582 | 0.770 |
| | 1.127 | 0.535 | 0.538 | 0.615 | 0.940 |
| | 1.154 | 0.567 | 0.576 | 0.593 | 1.140 |
| Average | 1.164 | 0.563 | 0.567 | 0.579 | 1.092 |
| Maximum-minimum | 0.17 | 0.13 | 0.11 | 0.08 | 0.73 |

As seen from Table 2, the blade sections of the cutting wheels manufactured in Examples have a thickness close to the desired dimension as compared with Comparative Example 1, and the thickness and radial protrusion extent of the blade section have substantially reduced variations.

Table 3 reports an average working time taken when the blade section manufactured in Examples 1 to 4 and Comparative Example 1 are trued in thickness and radial protrusion extent (10 wheels in Examples 1 to 4 and 5 wheels in Comparative Example 1).

TABLE 3

|  | Example | | | | Comparative Example |
|---|---|---|---|---|---|
|  | 1 | 2 | 3 | 4 | 1 |
| Thickness grinding time (min) | 118 | 84 | 66 | 46 | 376 |
| Radial protrusion grinding time (min) | 48 | 37 | 22 | 16 | 92 |
| Total grinding time (min) | 166 | 121 | 88 | 62 | 468 |

As seen from Table 3, Examples 1 to 4 reduce the total working time below ½ of the total working time taken in Comparative Example 1 although the working time differs in a certain range.

Figure 8:
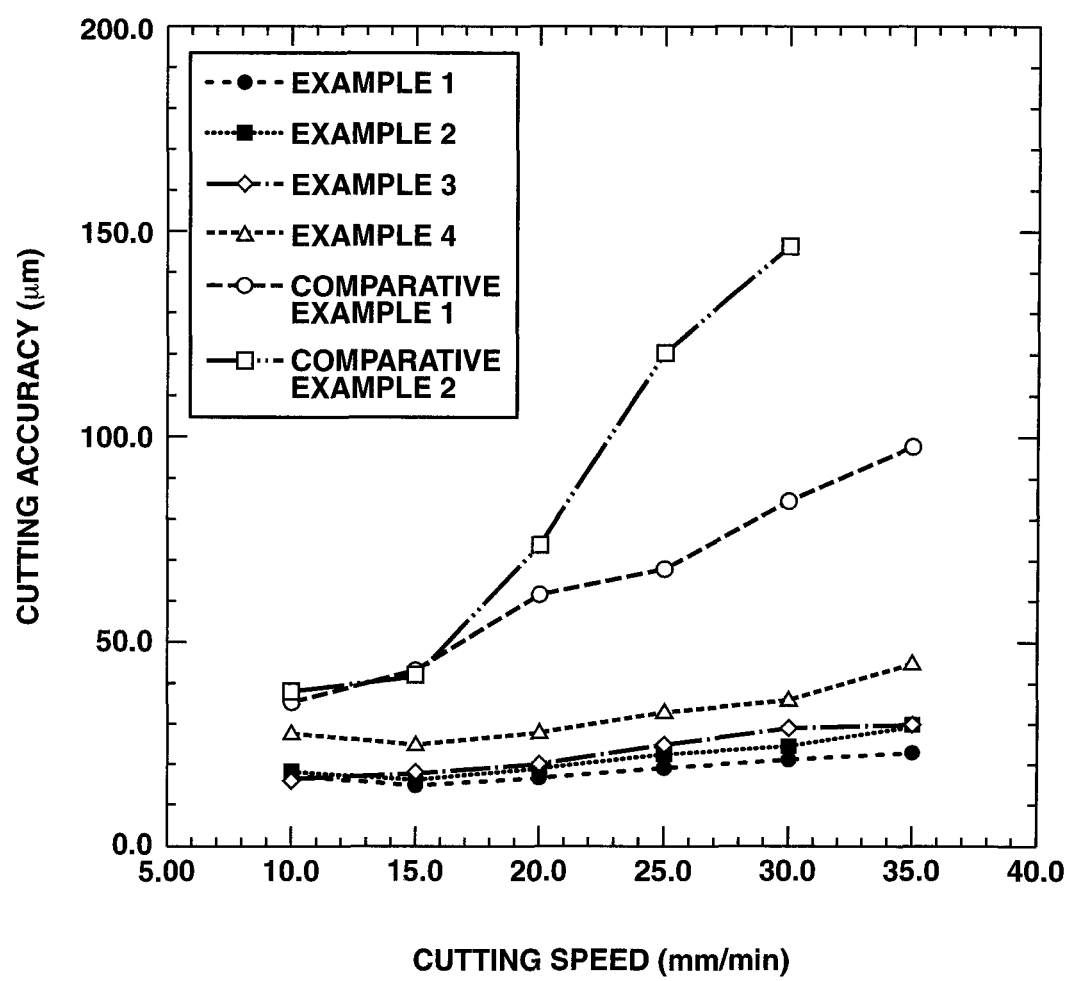
FIG. 8 is a diagram showing cutting accuracy versus cutting speed for Examples 1 to 4 and Comparative Examples 1 and 2.

FIG. 8 is a diagram illustrating a cutting accuracy versus a cutting speed. A cutting test was performed. A multiple wheel assembly was constructed by arranging two outer blade cutting wheels from each of Examples 1 to 4 and Comparative Examples 1 and 2 at a spacing of 1.5 mm. While the assembly was operated at 5,400 rpm and a cutting speed of 30 mm/min, from a Nd—Fe—B rare earth sintered magnet block of 40 mm wide×130 mm long×20 mm high, 50 magnet pieces of 40 mm wide×20 mm high×1.5 mm thick were cut out.

Thereafter, the cutting speed was changed in a range of 10 to 35 mm/min, and 5 magnet pieces were cut out at each speed. For each magnet piece, its thickness at five points, the center and four corners was measured by a micrometer. The difference between maximum and minimum values among these five measurements per magnet piece is a cutting accuracy (μm). An average of the cutting accuracies of five magnet pieces was computed and plotted in the diagram.

In Comparative Examples 1 and 2, the cutting accuracy gradually increases as the cutting speed increases. In Examples 1 to 4, the cutting accuracy is below 50 μm, though having minor variations, indicating that the dimensional variation is minimized even on high-speed cutting.

As is evident from these data combined with Table 3, a high-performance outer blade cutting wheel consisting of a base of cemented carbide and a blade section of metal bonded abrasive grains can be manufactured in high yields. In addition, the time taken until the wheel is worked to the desired size is significantly reduced.

Japanese Patent Application No. 2009-111762 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing an outer blade cutting wheel comprising a base in the form of an annular thin disc of cemented carbide having an outer periphery and side surfaces and a blade section formed on the outer periphery of the base, said method comprising the steps of:
   disposing at least two permanent magnet pieces having a remanence of at least 0.3 T, and a coercive force of at least 0.2 MA/m each on the side surface of the base and inward of the base outer periphery or within a space located inward of the base outer periphery and extending 20 mm from the side surface of the base, to produce a magnetic field of at least 8 kA/m at the base outer periphery and within a space extending 10 mm from the base outer periphery;
   sandwiching the base between a pair of jig members, the outer diameter of the jig member being larger than the outer diameter of the base and a space being formed by the jig members and the outer periphery of the base;
   providing diamond and/or CBN abrasive grains coated with a magnetic material such that said magnetic field may act on the diamond and/or CBN grains, causing the abrasive grains to be attracted and securely held in the space in proximity to the base outer periphery by the resultant attractive force, and
   electroplating or electroless plating on the base outer periphery with the abrasive grains attracted thereto whereby the abrasive grains are bound to the base outer periphery to form the blade section.

2. The method of claim 1 wherein the base in the form of an annular thin disc has an outer diameter of 80 to 200 mm, a thickness of 0.1 to 1.0 mm, an inner diameter of 30 to 80 mm, a Young's modulus of 450 to 700 GPa, and a saturation magnetization of at least 40 kA/m (0.05 T).

3. The method of claim 1 wherein one or more permanent magnet pieces are disposed contiguously or equidistantly on either or both side surface of the base and concentric with the disc-form base.

4. The method of claim 1, wherein the permanent magnet peaces have a remanence of at least 0.6 T and a coercive force of at least 0.8 MA/m.

5. The method of claim 1, wherein the magnetic field has the strength of at least 40 kA/m.

* * * * *